US011736674B2

(12) United States Patent
Lin et al.

(10) Patent No.: US 11,736,674 B2
(45) Date of Patent: Aug. 22, 2023

(54) DYNAMIC CONVERGENCE ADJUSTMENT IN AUGMENTED REALITY HEADSETS

(71) Applicant: Universal City Studios LLC, Universal City, CA (US)

(72) Inventors: Yu-Jen Lin, Orlando, FL (US); Patrick John Goergen, Orlando, FL (US); Martin Evan Graham, Clermont, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/465,043

(22) Filed: Sep. 2, 2021

(65) Prior Publication Data

US 2021/0400250 A1    Dec. 23, 2021

Related U.S. Application Data

(63) Continuation of application No. 17/019,980, filed on Sep. 14, 2020, now Pat. No. 11,122,249, which is a (Continued)

(51) Int. Cl.
*H04N 13/128* (2018.01)
*H04N 13/383* (2018.01)
(Continued)

(52) U.S. Cl.
CPC ....... *H04N 13/128* (2018.05); *G02B 27/0093* (2013.01); *G02B 27/0172* (2013.01);
(Continued)

(58) Field of Classification Search
CPC .................................................. H04N 13/383
See application file for complete search history.

(56) References Cited

U.S. PATENT DOCUMENTS

| 9,983,412 B1 | 5/2018 | Fuchs et al. |
| 11,036,055 B2 | 6/2021 | Ninan et al. |
| (Continued) | | |

FOREIGN PATENT DOCUMENTS

| CA | 2822978 A1 | 6/2012 |
| CA | 2950425 A1 | 12/2015 |
| (Continued) | | |

OTHER PUBLICATIONS

PCT/US2019/065184 International Search Report and Written Opinion dated Apr. 6, 2020.

*Primary Examiner* — Shivang I Patel
(74) *Attorney, Agent, or Firm* — Fletcher Yoder, P.C.

(57) ABSTRACT

Systems and methods are disclosed that dynamically and laterally shift each virtual object displayed by an augmented reality headset by a respective distance as the respective virtual object is displayed to change virtual depth from a first virtual depth to a second virtual depth. The respective distance may be determined based on a lateral distance between a first convergence vector of a user's eye with the respective virtual object at the first virtual depth and a second convergence vector of the user's eye with the respective virtual object at the second virtual depth along the display, and may be based on an interpupillary distance. In this manner, display of the virtual object may be adjusted such that the gazes of the user's eyes may converge where the virtual object appears to be.

20 Claims, 4 Drawing Sheets

Related U.S. Application Data continuation of application No. 16/226,471, filed on Dec. 19, 2018, now Pat. No. 10,778,953.

(60) Provisional application No. 62/777,545, filed on Dec. 10, 2018.

(51) Int. Cl.
- *H04N 13/344* (2018.01)
- *G02B 27/01* (2006.01)
- *G02B 27/00* (2006.01)
- *G06T 19/00* (2011.01)

(52) U.S. Cl.
CPC ......... *G06T 19/006* (2013.01); *H04N 13/344* (2018.05); *H04N 13/383* (2018.05)

(56) References Cited

U.S. PATENT DOCUMENTS

| | | |
|---|---|---|
| 2006/0250322 A1 | 11/2006 | Hall et al. |
| 2007/0248260 A1 | 10/2007 | Pockett |
| 2013/0300635 A1* | 11/2013 | White .................. H04N 13/383 345/7 |
| 2015/0237336 A1* | 8/2015 | Sylvan .................. G02B 30/34 348/54 |
| 2016/0133170 A1 | 5/2016 | Fateh |
| 2017/0171538 A1 | 6/2017 | Bell et al. |
| 2017/0295353 A1 | 10/2017 | Hwang et al. |
| 2018/0045963 A1* | 2/2018 | Hoover .................. G06F 3/013 |
| 2018/0348860 A1 | 12/2018 | Lin et al. |

FOREIGN PATENT DOCUMENTS

| | | |
|---|---|---|
| CN | 105072436 A | 11/2015 |
| CN | 105629475 A | 6/2016 |
| CN | 107861248 A | 3/2018 |
| CN | 207663150 U | 7/2018 |
| WO | 2015015811 A1 | 2/2015 |
| WO | 2016105521 A1 | 6/2016 |
| WO | 2017176898 A1 | 10/2017 |

\* cited by examiner

DYNAMIC CONVERGENCE ADJUSTMENT IN AUGMENTED REALITY HEADSETS

CROSS-REFERENCE TO RELATED APPLICATIONS

This application is a continuation of U.S. patent application Ser. No. 17/019,980, entitled "DYNAMIC CONVERGENCE ADJUSTMENT IN AUGMENTED REALITY HEADSETS," filed Sep. 14, 2020, which is a continuation of U.S. patent application Ser. No. 16/226,471, entitled "DYNAMIC CONVERGENCE ADJUSTMENT IN AUGMENTED REALITY HEADSETS," filed Dec. 19, 2018, which claims the benefit of U.S. Provisional Application No. 62/777,545, entitled "DYNAMIC CONVERGENCE ADJUSTMENT IN AUGMENTED REALITY HEADSETS," filed Dec. 10, 2018, each of which is hereby incorporated by reference in its entirety for all purposes.

BACKGROUND

The present disclosure relates generally to augmented reality, virtual reality, mixed reality, or any other suitable interactive computer-generated experience taking place within a simulated environment. More specifically, certain embodiments of the present disclosure relate to operational features of headsets providing the interactive computer-generated experience.

As, an example, augmented reality systems are increasing in popularity. It is now recognized that conventional techniques for providing augmented reality systems, such as augmented reality headsets, would benefit from improvements to system components and functionality. In particular, it is now recognized that certain traditional systems and techniques for providing augmented reality visual effects can cause sensory conflicts. Accordingly, there is a need to provide improved augmented reality systems that are configured to limit or prevent such sensor conflicts.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In particular, in one embodiment, an augmented reality system includes an augmented reality headset having a left display that displays a left virtual image to a left eye of a user. The augmented reality headset also includes a right display that displays a right virtual image to a right eye of a user. The left virtual image and the right virtual image appear as a single virtual image to the user when viewing the left virtual image and the right virtual image. The augmented reality headset further includes a pupil tracking sensor that detects and provides an indication of a pupil position of the user. The augmented reality system also includes a convergence adjustment system having an interpupillary distance determination engine that determines an interpupillary distance of the user based on receiving the indication of the pupil position. The convergence adjustment system also includes a display adjustment engine that provides an adjustment to display of a virtual object of the virtual image based on the interpupillary distance and an indication that the virtual object is changing virtual depth. The convergence adjustment system further includes a processor that displays the virtual object based on the adjustment from the display adjustment engine.

In another embodiment, a tangible, non-transitory, computer-readable medium that has instructions for adjusting display of a virtual object that, when executed by a processor, cause the processor to receive an indication that virtual objects are to be displayed as moving from a respective first virtual depth to a respective second virtual depth. The instructions also cause the processor to determine an interpupillary distance, and dynamically determine a respective lateral distance between a respective first gaze line associated with each virtual object at the respective first virtual depth and a respective second gaze line associated with the virtual object at the respective second virtual depth based on the interpupillary distance. The instructions further cause the processor to display each virtual object as moving from the respective first virtual depth to the respective second virtual depth based on the respective lateral distance.

In yet another embodiment, a method for adjusting display of a virtual object includes receiving an indication that one or more displayed objects are to be displayed as moving from a first virtual depth to a second virtual depth. The method also includes determining an interpupillary distance, and determining a lateral distance between a first convergence vector associated with a displayed object at the first virtual depth and a second convergence vector associated with the displayed object at the second virtual depth based on the interpupillary distance. The method further includes displaying the displayed object as moving from the first virtual depth to the second virtual depth based on the lateral distance.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
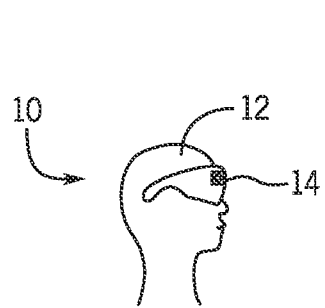
FIG. 1 is a perspective diagram of a user wearing an augmented reality headset, according to embodiments of the present disclosure.

In the real world, when a person views an object directly in front of them, the person simultaneously moves their eyes in opposite directions toward one another such that the gazes of each eye converges on the object or the pupil of each eye is in line with the object (a process referred to as vergence), and changes the optical power of their eyes to maintain a clear image of or focus on the object (a process referred to as accommodation). As such, a person is used to pointing their gaze at the same fixed point at which they are simultaneously focusing their eyes to maintain a clear image. If the person views the object as it moves closer, the gazes of each eye converge further together, and the optical power of the eyes changes to maintain a clear image of the object. If the person views the object as it moves further away, the gazes of each eye diverge, and the optical power of the eyes changes to maintain a clear image of the object. An augmented reality headset typically uses a display that simulates a depth of field. In particular, the display may be divided into a right display for the right eye to view and a left display for the left eye to view. Assuming the displays are generally rectangular, the augmented reality headset may display a virtual image having a virtual object directly in front of the user by displaying the virtual image having the virtual object on each of the right and left displays (e.g., a right virtual image having a right virtual object and a left virtual image having a left virtual object), with respective reference points (e.g., centers or approximate centers) of the respective virtual objects closer to the inside edge of each display than the outside edge. Moreover, the respective reference points of the virtual objects may be equal distances away from the inside edges of each display. This is because, when viewing a real world object, the gazes of each person's eyes will converge to the object the person is viewing.

To make the virtual object appear to be closer to the user, the augmented reality headset may enlarge the virtual objects on the displays, while maintaining the equal distances from the respective reference points of the virtual objects to the inside edges of each display. To make the virtual object appear to be further from the user, the augmented reality headset may shrink the virtual objects on the displays, while maintaining the equal distances from the respective reference points of the virtual objects to the inside edges of each display. However, it is now recognized that, because the respective reference points of the virtual objects maintain equal distances to the inside edges of each display when appearing to move closer and further from the user, the point at which a user's eyes converge may not be where the virtual object appears to be. That is, the point at which a user's eyes converge may be in front of or behind where the virtual object appears to be. This may cause a blurring or double image effect when viewing the virtual object, resulting in a negative user experience.

At the same time, the user's focus may be directed at where the virtual object appears to be. As such, a user may point their gaze at a different point than where they focus their eyes to maintain a clear image. This may create a vergence-accommodation conflict, which may lead to discomfort, fatigue, persisting headaches, and/or nausea.

In accordance with present embodiments, a display of a virtual reality headset may present/display virtual objects. Reference points of such objects (e.g., geometric center points along a particular dimension of the objects) may be utilized to describe operational features of present embodiments. In particular, distances between such reference points and features of an augmented reality headset are controlled in accordance with present embodiments to improve user experiences. For example, instead of maintaining a distance from centers of virtual objects to an inside edge of a display of an augmented reality headset when the virtual objects are presented as changing from a first virtual depth to a second virtual depth, present embodiments dynamically and laterally shift each virtual object by a respective distance as the respective virtual object is presented as changing from the first virtual depth to the second virtual depth. The respective distance may be dynamically determined based on a lateral distance between a first convergence vector of a user's eye with the respective virtual object at the first virtual depth and a second convergence vector of the user's eye with the respective virtual object at the second virtual depth along the display, and may be based on an interpupillary distance. In this manner, display of the virtual object may be adjusted such that the gazes of the user's eyes may converge where the virtual object appears to be. As such, the user may point their gaze at the same point as where they focus their eyes to maintain a clear image. Thus, the presently disclosed systems and methods may reduce or eliminate the vergence-accommodation conflict when displaying a change in virtual depth of a virtual object, reducing or avoiding possible blurring or double image effects when viewing the virtual object, discomfort, fatigue, persisting headaches, and/or nausea, resulting in a better user experience.

While the present disclosure discusses the use of augmented reality and augmented reality headsets, it should be understood that the disclosed techniques may also apply to virtual reality, mixed reality, or any other suitable interactive computer-generated experience taking place within a simulated environment. Moreover, use of the term "depth" with reference to a virtual object should be understood to refer to a virtual depth of the virtual object. That is, the terms "depth" and "virtual depth" refer to a depth that the virtual object appears to be located or disposed at (e.g., from the user's perspective) based on viewing the virtual object through an augmented reality headset.

With this in mind, FIG. 1 is a perspective diagram of a user 10 wearing an augmented reality headset 12, according to embodiments of the present disclosure. The augmented reality headset 12 may provide a simulated visual environment overlaid or in conjunction with a real world environment. As illustrated, the augmented reality headset 12 may include a front-facing camera 14 that provides display of the real world environment to the user 10. In additional or alternative embodiments, the augmented reality headset 12 may instead include lenses or a transparent display, where the user 10 directly views the real world environment. That is, the augmented reality headset 12 may be provided to the user 10 without reproducing the real world environment via a display.

Figure 2:
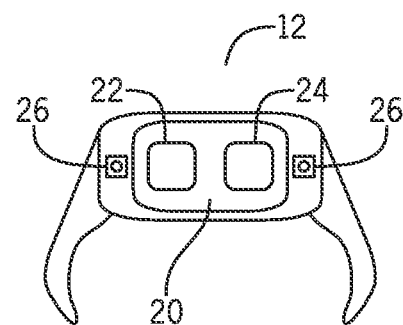
FIG. 2 is a perspective diagram of the augmented reality headset of FIG. 1 from the perspective of the user, according to embodiments of the present disclosure.

FIG. 2 is a perspective diagram of the augmented reality headset 12 from the perspective of the user 10, according to embodiments of the present disclosure. As illustrated, the augmented reality headset 12 includes a display 20, which may be divided into two separate displays 22, 24. In particular, a left display 22 may be viewed by the user's left eye and a right display 24 may be viewed by the user's right eye. In some embodiments, the left display 22 and right display 24 may be two different physical displays, and not part of the single display 20. The display 20 may include an opaque screen, which reproduces the real world environment to the user 10 via images received via the front-facing camera 14 shown in FIG. 1. For example, the display 20 may be a smartphone or tablet, which may be inserted into or removably coupled (e.g., able to be detached and coupled repeatedly) to the augmented reality headset 12. In some embodiment, the display 20 may be a fixed component of the augmented reality headset 12. Moreover, in additional or alternative embodiments, the display 20 includes a transparent or semi-transparent screen or lens that enables the user 10 to directly view the real environment through the screen or lens. A simulated visual environment may then be overlaid or otherwise displayed in conjunction with the viewable real world environment. In some embodiments, the augmented reality headset 12 may include eye or pupil tracking sensors 26 that determine positions of the user's eyes or pupils and/or send one or more signals indicative of the positions of the user's eyes or pupils.

Figure 3:
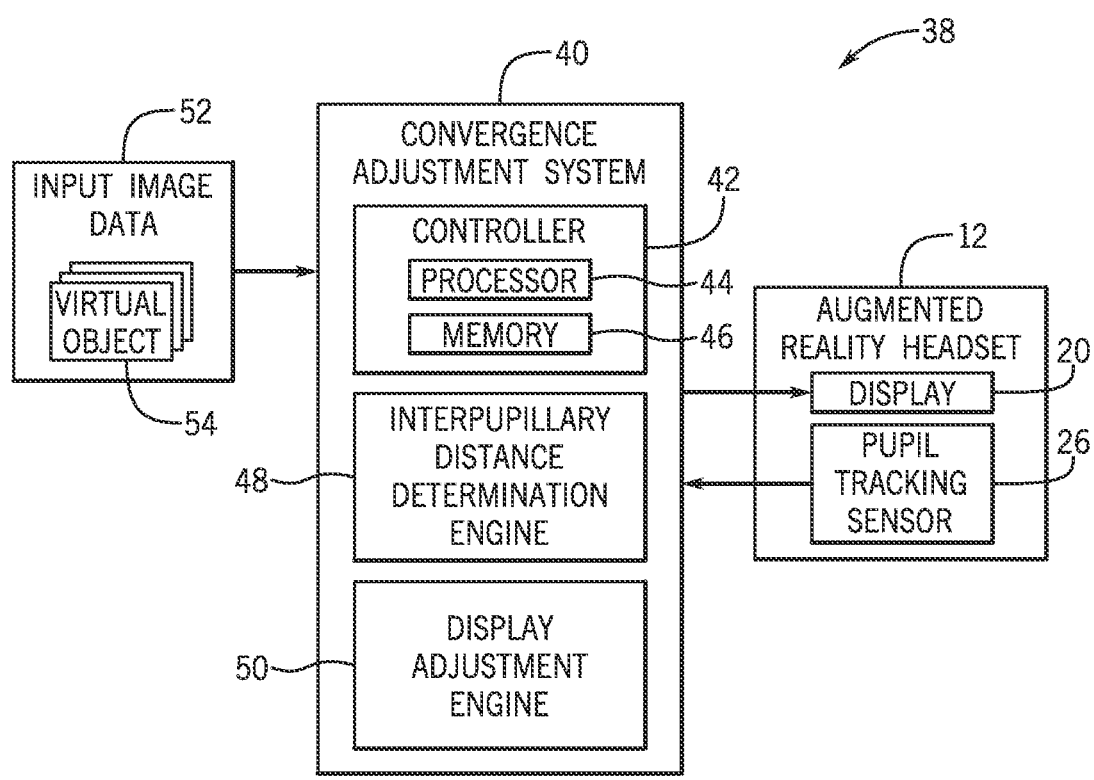
FIG. 3 is a block diagram of an augmented reality system that incorporates the augmented reality headset of FIG. 1, according to embodiments of the present disclosure.

FIG. 3 is a block diagram of an augmented reality system 38, according to embodiments of the present disclosure. As illustrated, the augmented reality system 38 includes a convergence adjustment system 40 having a controller 42 that includes one or more processors 44 and one or more memory devices 46. The processor 44 may execute software programs and/or instructions to adjust display of a virtual object. Moreover, the processor 44 may include multiple microprocessors, one or more "general-purpose" microprocessors, one or more special-purpose microprocessors, and/or one or more application specific integrated circuits (ASICS), and/or one or more reduced instruction set (RISC) processors. The memory device 46 may include one or more storage devices, and may store machine-readable and/or processor-executable instructions (e.g., firmware or software) for the processor 44 to execute, such as instructions relating to adjusting display of a virtual object. As such, the memory device 46 may store, for example, control software, look up tables, configuration data, and so forth, to facilitate adjusting display of a virtual object. In some embodiments, the processor 44 and the memory device 46 may be external to the controller 42. The memory device 46 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium).

The convergence adjustment system 40 may also include an interpupillary distance determination engine 48 that dynamically determines an interpupillary distance of the user 10. The interpupillary distance may be a distance between the user's pupils. In some embodiments, the interpupillary distance determination engine 48 may receive a signal from the pupil tracking sensor 26 of the augmented reality headset 12 indicative of the interpupillary distance. The interpupillary distance determination engine 48 may then determine the interpupillary distance based on the received signal.

In additional or alternative embodiments, the interpupillary distance determination engine 48 may estimate the interpupillary distance based on a calibration process. That is, when the user 10 first equips the augmented reality headset 12, the controller 42 of the convergence adjustment system 40 may perform the calibration process. The calibration process may include showing a number of virtual objects at different virtual depths, and prompting the user 10 to respond when the user 10 sees a single image versus a double image of a respective virtual object. The user's responses corresponding to seeing the single image may be used to estimate positions of the user's eyes by triangulating the estimated positions of the user's eyes with the different virtual depths at which the virtual objects are displayed. The interpupillary distance determination engine 48 may determine a set of interpupillary distances at the different virtual depths based on the estimated positions of the user's eyes. As such, the interpupillary distance determinations may be saved, and the interpupillary distance determination engine 48 may perform regression analysis or any other suitable form of estimation analysis to generate a mathematical model or expression that predicts the interpupillary distance depending on a virtual depth of a virtual object based on the set of saved interpupillary distance determinations. The interpupillary distance determination engine 48 may dynamically determine or estimate the interpupillary distance of the user 10 as the interpupillary distance may change as the user 10 views different objects (virtual or real). As such, it may be useful to constantly, periodically, or at certain times or points of interest (e.g., when a different virtual object is displayed or real object comes into view) to update the interpupillary distance of the user 10. It should be understood that the term "engine," as used in the present disclosure, may include hardware (such as circuitry), software (such as instructions stored in the memory device 46 for execution by the processor 44), or a combination of the two. For example, the interpupillary distance determination engine 48 may include pupil tracking sensors 26 and circuitry coupled to the pupil tracking sensors 26 that receive pupil tracking information from the pupil tracking sensors 26 and determine the interpupillary distance of the user 10 based on the pupil tracking information.

The convergence adjustment system 40 may further include a display adjustment engine 50 that adjusts display of a virtual object and/or provides an adjustment to the display of the virtual object based on an interpupillary distance of the user 10. In particular, the display adjustment engine 50 may receive input image data 52, which may include one or more virtual objects 54. Each virtual object 54 may be displayed at a respective virtual depth. The display adjustment engine 50 may also receive the interpupillary distance as determined by the interpupillary distance determination engine 48. The display adjustment engine 50 may then adjust display of each virtual object 54 based on the interpupillary distance.

In some cases, the convergence adjustment system 40 may be part of the augmented reality headset 12. In additional or alternative embodiments, the convergence adjustment system 40 may be external to the augmented reality headset 12, and communicate with the augmented reality headset 12 via any suitable communication network and/or protocol. For example, each of the augmented reality headset 12 and the convergence adjustment system 40 may include a communication interface, and the communication interfaces may connect to a communication network. The communication network may be wired and/or wireless, such as a mobile network, WiFi, LAN, WAN, Internet, and/or the like, and enable the augmented reality headset 12 and the convergence adjustment system 40 to communicate with one another.

Figure 4:
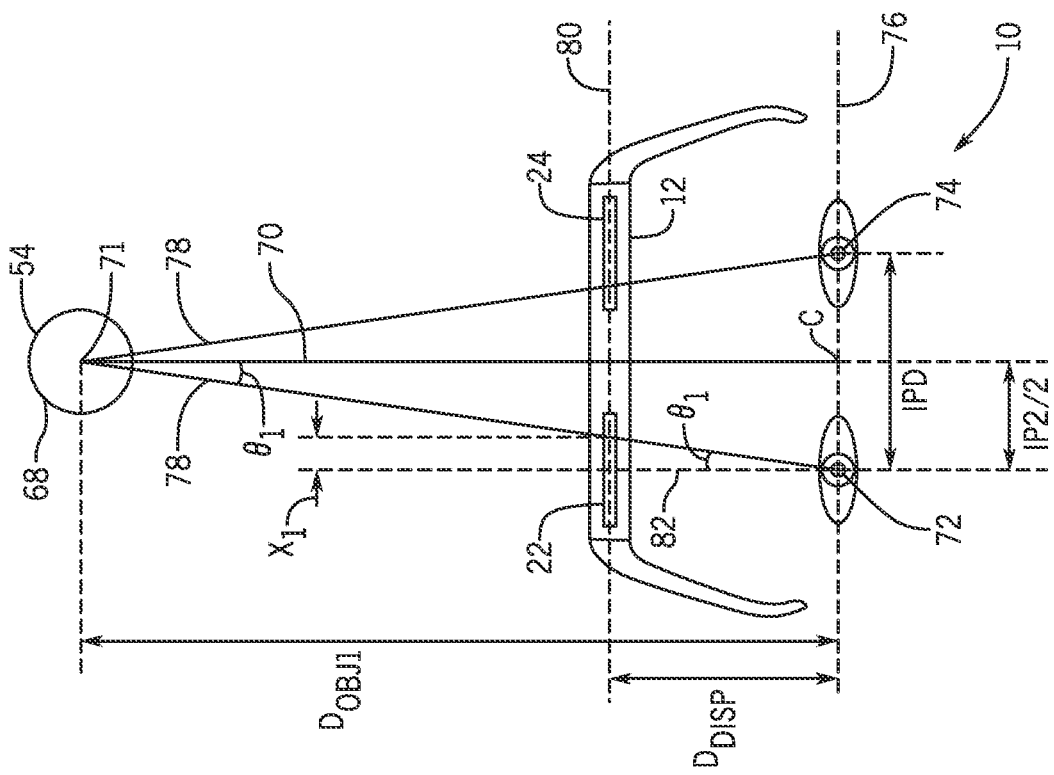
FIG. 4 is a schematic plan view of a user viewing a virtual object through the augmented reality headset of FIG. 1.

As an example, FIG. 4 is a schematic plan view of a user 10 viewing a virtual object 54 through an augmented reality headset 12, according to embodiments of the present disclosure. The virtual object 54 is displayed at a virtual position 68 and a virtual depth that simulates a virtual distance $D_{OBJ1}$ along a center line 70 passing through a center point C between the user's pupils 72, 74 and a reference point (e.g., a center) 71 of the virtual object 54. The center point C may be any suitable point for which the user 10 experiences as a source of vision, such as a point between the user's pupils 72, 74, such that the distance between the point C and a first user's pupil 72 is approximately equal to the distance between the point C and a second user's pupil 74. While the present disclosure illustrates reference points of virtual objects as centers of the virtual objects, it should be understood that reference points other than centers of the virtual objects may be used (e.g., such as any suitable point along a surface, interior, body, or edge of an virtual object), particularly in the cases where the virtual objects may be irregularly or asymmetrically shaped.

The interpupillary distance between the user's pupils 72, 74 is indicated along an interpupillary line 76 passing through the user's pupils 72, 74 as IPD in FIG. 4, and the distance between the center point C and either of the user's pupils 70, 72 along the interpupillary line 76 is indicated as IPD/2 in FIG. 4. Additionally, as shown in FIG. 4, a gaze line or convergence vector 78 between either of the user's pupils 72, 74 and the virtual object 54 makes an angle $\theta_1$ with the center line 70. FIG. 4 also illustrates a display line 80 that passes through (e.g., generally passes through the centers of) displays 22, 24 augmented reality headset 12. A display distance $D_{DISP}$ between either of the user's pupils 72, 74 and the display line 80 is indicated along a display distance line 82 that intersects the display line 80. Because the display distance line 82 and the center line 70 are parallel, the display distance line 82 and the gaze line 78 also intersect at the angle $\theta_1$, as illustrated in FIG. 4. A distance between the display distance line 82 and the gaze line 78 along the display line 80 is indicated as $X_1$ (which may be referred to as a lateral pupil distance to view the virtual object 54 at the position 68), and may be determined based on the rule of similar triangles. In particular, $X_1$ may be determined using the equation below:

$$X_1 = ((IPD/2)/D_{OBJ1})*D_{DISP} \qquad \text{(Equation 1)}$$

Figure 5:
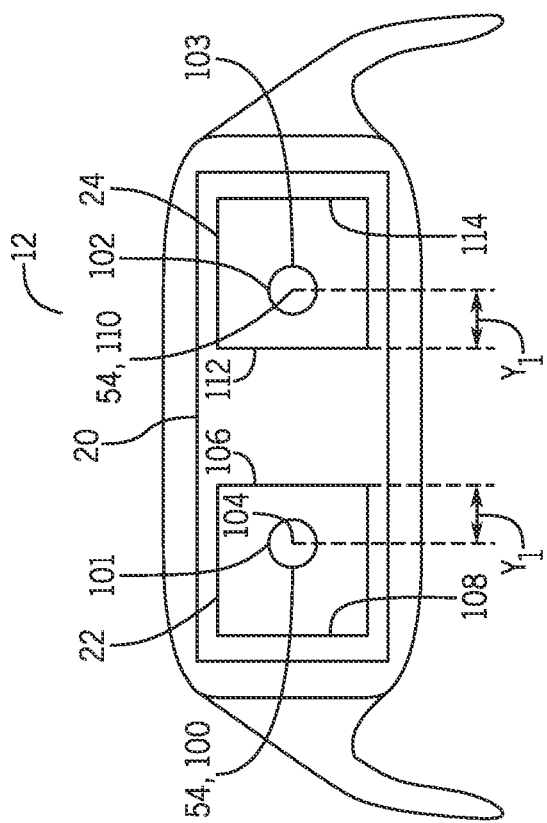
FIG. 5 is a schematic representation of a user's perspective of the virtual object of FIG. 4 being viewed through the augmented reality headset, according to embodiments of the present disclosure.

FIG. 5 is a schematic representation of a user's perspective of the virtual object 54 of FIG. 4 being viewed through the augmented reality headset 12, according to embodiments of the present disclosure. The controller 42 of the convergence adjustment system 40 displays the virtual object 54 as a left virtual object 100 at a left position 101 on the left display 22 for the user's left eye to view and a right virtual object 102 at a right position 103 on the right display 24 for the user's right eye to view. The augmented reality headset 12 displays the virtual object 54 as appearing as directly in front of the user 10 (e.g., along the center line 70 of FIG. 4). As such, the controller 42 may display a reference point (e.g., a center) 104 of the left virtual object 100 closer to the inside (e.g., rightmost) edge 106 of the left display 22 than the outside (e.g., leftmost) edge 108, and may display a reference point (e.g., a center) 110 of the right virtual object 102 closer to the inside (e.g., leftmost) edge 112 of the right display 24 than the outside (e.g., rightmost) edge 114. Moreover, the reference points 104, 110 of the virtual objects 100, 102 may be equal distances $Y_1$ away from the inside edges 106, 112 of each display 22, 24. This is to display the virtual objects 100, 102 at the convergence point of the gaze lines or convergence vectors 78 of the user's eyes, thus enabling the virtual objects 100, 102 to appear as a single virtual object (identified as virtual object 54 in FIG. 4). As such, the controller 42 may display the virtual objects 100, 102 the distances $Y_1$ away from the inside edges 106, 112 of each display 22, 24 to make the virtual object 54 appear to be at the virtual position 68 at the convergence point of the gaze lines 78 of the user's pupils 72, 74.

Figure 6:
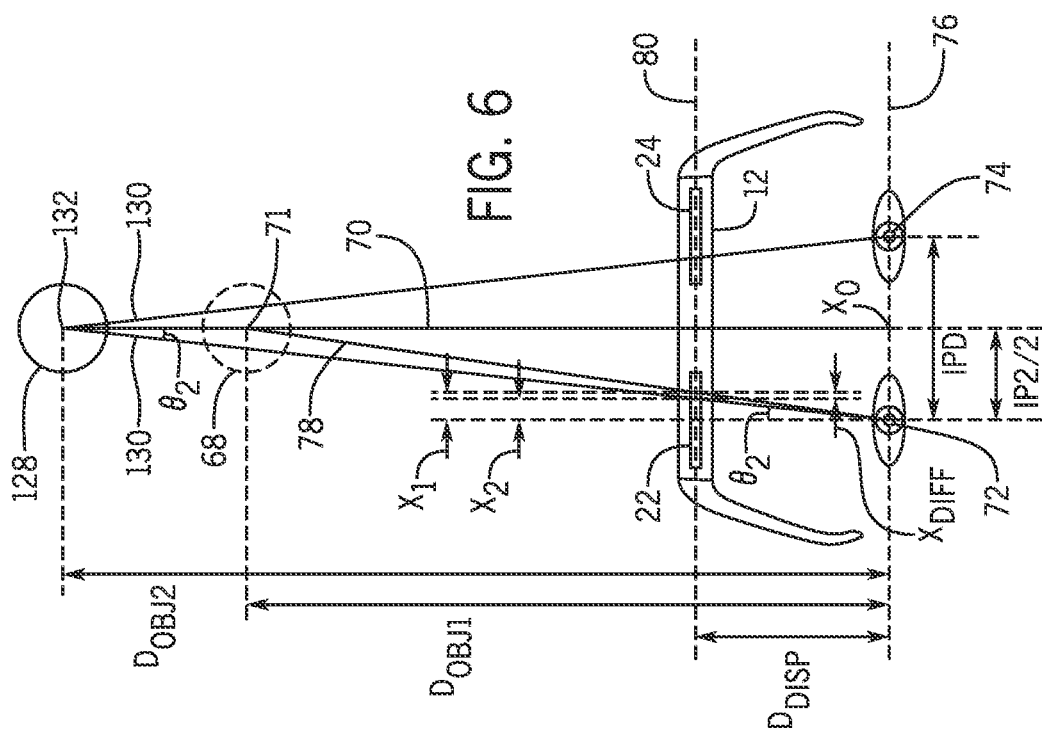
FIG. 6 is a schematic plan view of a user viewing the virtual object of FIG. 4 through the augmented reality headset as it changes virtual depth, according to embodiments of the present disclosure.

As a further example, FIG. 6 is a schematic plan view of a user 10 viewing the virtual object 54 of FIG. 4 through the augmented reality headset 12 as it changes depth, according to embodiments of the present disclosure. In particular, the controller 42 of the convergence adjustment system 40 may appear to change the depth of the virtual object 54 from the original position 68 at the first depth that simulates the first virtual distance $D_{OBJ1}$ along the center line 70 to a second position 128 at a second depth that simulates a second virtual distance $D_{OBJ2}$. To make the virtual object 54 appear to change depth, the controller 42 may change the size of the virtual object 54. In this case, the controller 42 shrinks the virtual object 54 to make the virtual object 54 seem further away than when the virtual object 54 was at the original position 68. In the case where the controller 42 appears to make the virtual object 54 move from a further depth to a closer depth, the controller 42 may instead enlarge the virtual object 54 from when the virtual object 54 was at the original position 68.

The first gaze line or convergence vector 78 between either of the user's pupils 72, 74 and the reference point 71 of the virtual object 54 at the first virtual distance $D_{OBJ1}$, which makes the angle $\theta_1$ with the center line 70, changes to a second gaze line or convergence vector 130 between either of the user's pupils 72, 74 and the reference point 132 of the virtual object 54 at the second virtual distance $D_{OBJ2}$, which makes an angle $\theta_2$ with the center line 70, as the virtual object 54 changes depth. A distance between the display distance line 82 and the second gaze line 130 along the display line 80 is indicated as $X_2$ (which may be referred to as a second lateral pupil distance to view the virtual object 54 at the position 128), and may be determined based on the rule of similar triangles. In particular, $X_2$ may be determined using the equation below:

$$X_2 = ((IPD/2)/D_{OBJ2})*D_{DISP} \qquad \text{(Equation 2)}$$

As such, the distance that the pupil moves at the display line 80 due to the change in depth of the virtual object 54 may be expressed as the difference between the distance between the display distance line 82 and the gaze line 78 along the display line 80 (e.g., $X_1$), and the distance between the display distance line 82 and the second gaze line 130 along the display line 80 (e.g., $X_2$), which may be referred to as $X_{DIFF}$ using the equation below:

$$X_{DIFF} = |X_1 - X_2| \qquad \text{(Equation 3)}$$

Because the illustrated example of changing depth in FIG. 6 moves the virtual object 54 from a closer depth to a further depth, the distance between the display distance line 82 and the gaze line 78 corresponding to the closer depth along the display line 80 (e.g., $X_1$) may be greater than the distance between the display distance line 82 and the second gaze line 130 corresponding to the further depth along the display line 80 (e.g., $X_2$). As such, the difference between the two (e.g., $X_{DIFF}$) may be positive. However, when the virtual object 54 moves from a further depth to a closer depth, the difference between the two (e.g., $X_{DIFF}$) may be negative. As such, the absolute value may be taken, as shown in Equation 3, to obtain a positive value.

Figure 7:
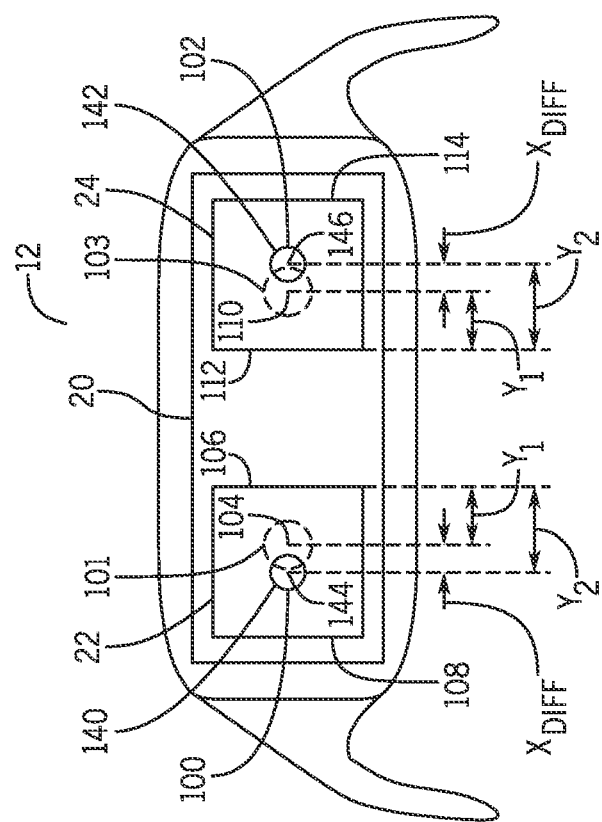
FIG. 7 is a schematic representation of a user's perspective of the virtual object of FIG. 6 when viewed through the augmented reality headset as the virtual object changes virtual depth, according to embodiments of the present disclosure.

FIG. 7 is a schematic representation of a user's perspective of the virtual object 54 of FIG. 6 when viewed through the augmented reality headset 12 as the virtual object changes depth, according to embodiments of the present disclosure. The controller 42 of the convergence adjustment system 40 displays the left virtual object 100 moving from the original left position 101 to a second left position 140 on the left display 22 for the user's left eye to view, and displays the right virtual object 102 moving from the original right position 103 to a second right position 142 on the right display 24 for the user's right eye to view. The augmented reality headset 12 displays the virtual object 54 as appearing as directly in front of the user 10 (e.g., along the center line 70 of FIG. 6). As such, the controller 42 may display a reference point (e.g., a center) 144 of the left virtual object 100 (at the second left position 140) closer to the inside (e.g., rightmost) edge 106 of the left display 22 than the outside (e.g., leftmost) edge 108, and may display a reference point (e.g., center) 146 of the right virtual object 102 (at the second right position 142) closer to the inside (e.g., leftmost) edge 112 of the right display 24 than the outside (e.g., rightmost) edge 114. Moreover, the reference points 144, 146 of the virtual objects 100, 102 (at the second left and right positions 140, 142) may be equal distances $Y_2$ away from the inside edges 106, 112 of each display 22, 24. This is to display the virtual objects 100, 102 at the convergence point of the gaze lines or convergence vectors 78 of the user's eyes, thus enabling the virtual objects 100, 102 to appear as a single virtual object (identified as virtual object 54 in FIG. 4). As such, the controller 42 may display the virtual objects 100, 102 the distances $Y_2$ away from the inside edges 106, 112 of each display 22, 24 to make the virtual object 54 appear to be at the second virtual position 128 at the convergence point of the gaze lines 130 of the user's pupils 72, 74.

To determine the distances $Y_2$ from the inside edges 106, 112 of each display 22, 24 to the reference points 144, 146 of the left and right virtual objects 100, 102, the controller 42 may determine the distance $Y_1$ from the reference points 104, 110 of the virtual objects 100, 102 from the inside edges 106, 112 of each display 22, 24. The controller 42 may also determine the difference $X_{DIFF}$ between the distance $X_1$ between the display distance line 82 and the gaze line 78 along the display line 80, and the distance $X_2$ between the display distance line 82 and the second gaze line 130 along the display line. In particular, in this case, where the controller 42 makes the virtual object 54 seem further away than when the virtual object 54 was at the original position 68, the controller 42 may move each of the left and right virtual objects 100, 102 toward the outer edges 108, 114 of each display 22, 24. As such, the controller 42 may add the difference $X_{DIFF}$ to the distance $Y_1$ to determine the distance $Y_2$. In cases where the controller 42 makes the virtual object 54 seem closer than when the virtual object 54 was at the original position 68, the controller 42 may move each of the left and right virtual objects 100, 102 toward the inner edges 106, 112 of each display 22, 24. As such, the controller 42 may subtract the difference $X_{DIFF}$ from the distance $Y_1$ to determine the distance $Y_2$.

Thus, the controller 42 may display the virtual objects 100, 102 the difference $X_{DIFF}$ away from the distances $Y_1$ away from the inside edges 106, 112 of each display 22, 24 to make the virtual object 54 appear to be at the second virtual position 128 at the convergence point of the gaze lines or convergence vectors 130 of the user's pupils 72, 74.

The controller 42 may determine the difference $X_{DIFF}$ between the distance between the display distance line 82 and the gaze line 78 corresponding to the closer depth along the display line 80 (e.g., $X_1$) and the distance between the display distance line 82 and the second gaze line 130 corresponding to the further depth along the display line 80 (e.g., $X_2$) for multiple virtual objects 54, and display changes in depths of the multiple virtual objects 54 based on each respective difference $X_{DIFF}$. Indeed, in some circumstances, if multiple virtual objects 54 at different depths change their respective depths and a respective difference $X_{DIFF}$ is not determined and applied for each virtual object 54 (e.g., the same difference $X_{DIFF}$ is applied to each virtual object 54), then the user 10 may experience a "jumping" effect of at least some of the multiple virtual objects 54 due to the unnatural and unrealistic shifting of at least some of the multiple virtual objects 54. As such, the controller 42 may dynamically determine the difference $X_{DIFF}$ for each virtual object 54 separately as the controller 42 receives an indication that the respective virtual object 54 is changing depth.

Moreover, as illustrated, the controller 42 shrinks the virtual objects 100, 102 at the second positions 140, 142 to make the virtual objects 100, 102 seem further away than when the virtual objects 100, 102 were at their respective original positions 101, 103. In the case where the controller 42 appears to make the virtual objects 100, 102 move from a further depth to a closer depth, the controller 42 may instead enlarge the virtual objects 100, 102 from when the virtual objects 100, 102 were at their respective original positions 101, 103.

The determination of the lateral distance $X_{DIFF}$ may be dependent on the center line 70 and the display line 80 being perpendicular to the interpupillary line 76, as it may be assumed that the user 10 primarily looks forward to view the virtual objects 54. Instead of moving their eyes to look at other objects, it may be assumed that the user 10 may turn his or her head to look at the other objects. Therefore, all virtual objects at the same depth may laterally shift the same lateral distance $X_{DIFF}$ toward the same direction. In cases where the user 10 is not assumed to primarily look forward to view the virtual objects 54, the controller 42 may apply a shifting deformation to or progressively adjust the display of the virtual object 54, based on and/or to compensate for the different focal length of the virtual objects 54.

Figure 8:
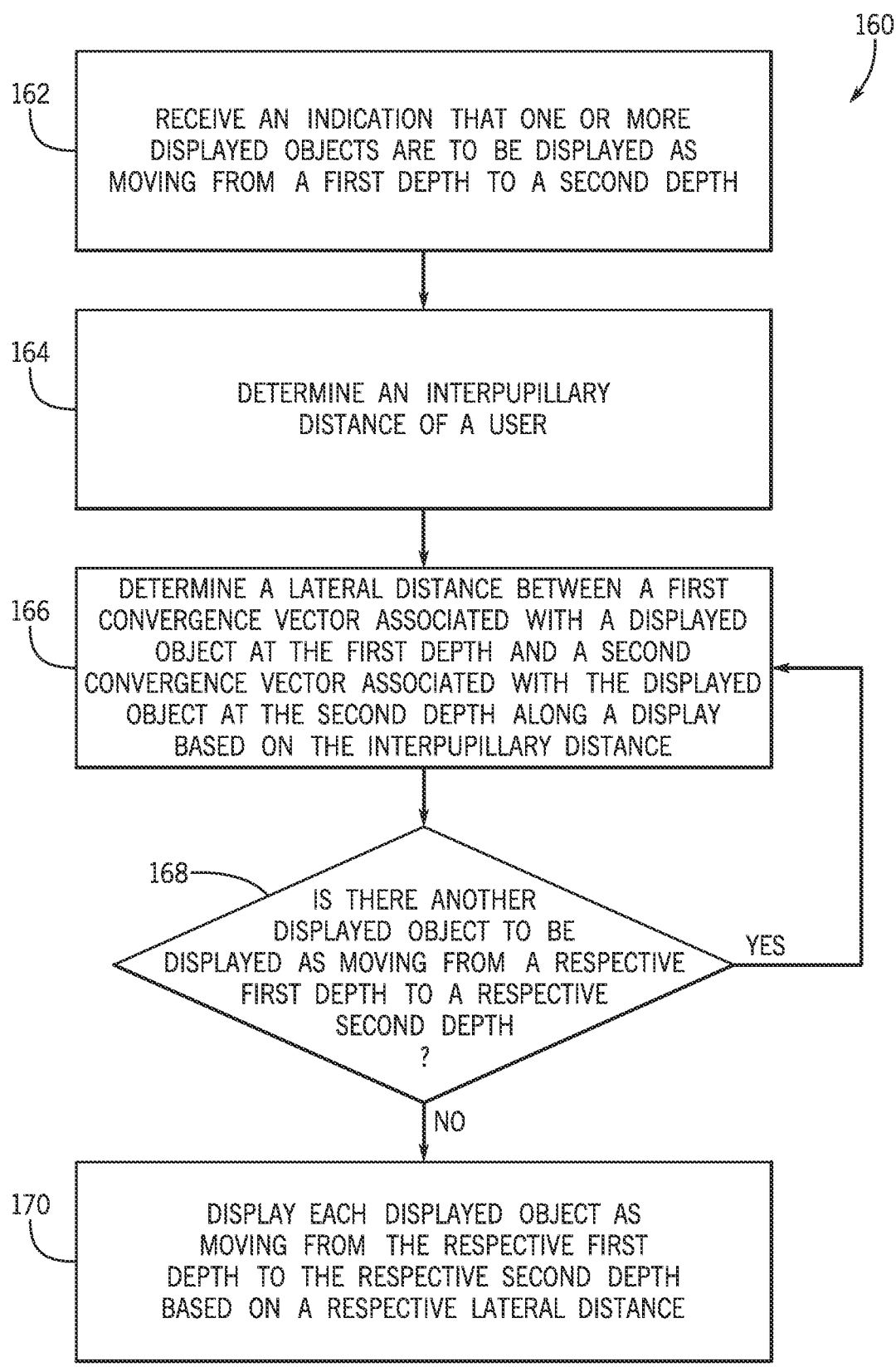
FIG. 8 is a flowchart of a process for adjusting display of a virtual object, according to embodiments of the present disclosure.

FIG. 8 is a flowchart of a process 160 for adjusting display of a virtual object 54, according to embodiments of the present disclosure. In particular, the convergence adjustment system 40 may implement the process 160 to adjust display of the virtual object 54. The process 160 may be in the form of one or more software applications that include instructions that are executed by at least one suitable processor, such as the processor 44 of the controller 42, via the interpupillary distance determination engine 48 and/or the display adjustment engine 50. The illustrated process 160 is merely provided as an example, and in other embodiments, certain illustrated steps of the process 160 may be performed in other orders, skipped, repeated, or not shown, in accordance with the present disclosure.

As illustrated, in process block 162, the processor 44 receives an indication that one or more displayed objects are to be displayed as moving from a first depth to a second depth. For example, the processor 44 may determine that the display 20 is displaying one or more virtual objects 54. The processor 44 may receive the input image data 52, which may include the one or more virtual objects 54 changing depth. As a result, the processor 44 may determine that the one or more virtual objects 54 are changing their respective depths from a respective first depth to a respective second depth. In additional or alternative embodiments, the processor 44 may receive one or more input signals (e.g., one or more change depth indication signals) that directly indicate that the one or more virtual objects 54 are changing their respective depths. With reference to FIG. 6, the processor 44 may receive an indication that the virtual object 54 is changing depth from a first position 68 at a first depth to a second position 128 at a second depth.

In process block 164, the processor 44 determines an interpupillary distance of a user. For example, the processor 44 may receive pupil position information from the pupil tracking sensor 26 shown in FIG. 3, and instruct the interpupillary distance determination engine 48 to determine the interpupillary distance (e.g., the IPD as shown in FIG. 4) based on the pupil position information. In additional or alternative embodiments, the processor 44 may instruct the interpupillary distance determination engine 48 to estimate the interpupillary distance based on a calibration process and/or performing regression analysis or any other suitable form of estimation analysis. That is, the processor 44 may show a number of virtual objects at different virtual depths on the display 20, and prompt the user 10 to respond when the user 10 sees a single image versus a double image of a respective virtual object. The user's responses corresponding to seeing the single image may be used to estimate positions of the user's eyes by triangulating the estimated positions of the user's eyes with the different virtual depths at which the virtual objects are displayed. The processor 44 may determine a set of interpupillary distances at the different virtual depths based on the estimated positions of the user's eyes. The interpupillary distance determinations may be saved, and the processor 44 may perform regression analysis or any other suitable form of estimation analysis to generate a mathematical model or expression that predicts the interpupillary distance depending on a virtual depth of a virtual object based on the set of saved interpupillary distance determinations. The interpupillary distance determination engine 48 may dynamically determine or estimate the interpupillary distance of the user 10 as the interpupillary distance may change as the user 10 views different objects (virtual or real). As such, it may be useful to constantly, periodically, or at certain times or points of interest (e.g., when a different virtual object is displayed or real object comes into view) to update the interpupillary distance of the user 10.

In process block 166, the processor 44 determines a lateral distance between a first convergence vector associated a displayed object at the first depth and a second convergence vector associated with the displayed object at the second depth along a display based on the interpupillary distance. With reference to FIG. 6, the first convergence vector or gaze line 78 is associated with the virtual object 54 at the first position 68 at a first depth. The second convergence vector or gaze line 130 is associated with the virtual object 54 at the second position 128 at a second depth.

The lateral distance $X_{DIFF}$ is the difference between the first convergence vector 78 and the second convergence vector 130 along the display line 80. The processor 44 may determine the lateral distance $X_{DIFF}$ by determining the distance $X_1$ between the display distance line 82 and the first convergence vector 78 along the display line 80. In particular, the processor 44 may determine $X_1$ by dividing half of the interpupillary distance (IPD/2) by the first virtual distance ($D_{OBJ1}$) between the center point C between the user's pupils 72, 74 and the reference point (e.g., the center) 71 of the virtual object 54 at the first position 68, and multiplying the result by the display distance $D_{DISP}$ between either of the user's pupils 72, 74 and the display line 80, as expressed in Equation 1 above. The processor 44 may determine $X_2$ by dividing half of the interpupillary distance (IPD/2) by the second virtual distance ($D_{OBJ2}$) between the center point C between the user's pupils 72, 74 and the reference point (e.g., the center) 132 of the virtual object 54 at the second position 128, and multiplying the result by the display distance $D_{DISP}$ between either of the user's pupils 72, 74 and the display line 80, as expressed in Equation 2 above. In some embodiments, the absolute value of the difference between $X_1$ and $X_2$ may be taken to ensure a positive value, as shown in Equation 3 above. The processor 44 may save the lateral distance $X_{DIFF}$ in any suitable memory or storage device, such as the memory device 46.

In decision block 168, the processor 44 determines whether there is another displayed object to be displayed as moving from a respective first depth to a respective second depth. If so, the processor 44 repeats process block 166 to determine the lateral distance $X_{DIFF}$ between a first convergence vector associated with the additional virtual object at the respective first depth and a second convergence vector associated with the additional virtual object at the respective second depth along the display 20 based on the interpupillary distance. As such, the processor 44 may dynamically determine the difference $X_{DIFF}$ for each virtual object 54 separately, such that each virtual object 54 may correspond to a different lateral difference $X_{DIFF}$ value.

If the processor 44 determines that there is not another displayed object to be displayed as moving from a respective first depth to a respective second depth, the processor 44, in process block 170, displays each displayed object as moving from the respective first depth to the respective second depth based on a respective lateral distance. In particular, the processor 44 may shift the reference points 144, 146 of each virtual object 100, 102 displayed on the displays 22, 24 by the lateral distance $X_{DIFF}$. For example, as shown in FIG. 7, where the first depth is closer to the user 10 than the second depth, the processor 44 may move each of the left and right virtual objects 100, 102 toward the outer edges 108, 114 of each display 22, 24 by the lateral difference $X_{DIFF}$ (thus adding the lateral difference $X_{DIFF}$ to the distance $Y_1$ to determine the distance $Y_2$). In cases where the first depth is further from the user 10 than the second depth, the processor 44 may move each of the left and right virtual objects 100, 102 toward the inner edges 106, 112 of each display 22, 24 by the lateral difference $X_{DIFF}$ (thus subtracting the lateral difference $X_{DIFF}$ from the distance $Y_1$ to determine the distance $Y_2$). In this manner, the processor 44 may implement the process 160 to adjust display of a virtual object 54 to make the virtual object 54 appear at the convergence point of the convergence vectors 130 of the user's pupils 72, 74, reducing or avoiding possible blurring or double image effects when viewing the virtual object 54, discomfort, fatigue, persisting headaches, and/or nausea, resulting in a better user experience.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An augmented reality system comprising:
an augmented reality headset configured to display virtual imagery; and
one or more processors configured to:
generate a first virtual image for display via the augmented reality headset, wherein the first virtual image comprises a virtual object at a first virtual depth;
receive input image data comprising an indication that the virtual object is to be displayed as moving from the first virtual depth to a second virtual depth;
determine a lateral adjustment to be applied to the virtual object based on an interpupillary distance of a user of the augmented reality headset and the indication that the virtual object is to be displayed as moving from the first virtual depth to the second virtual depth; and
generate a second virtual image for display via the augmented reality headset based on the input image data, wherein the second virtual image comprises the virtual object at the second virtual depth and with the lateral adjustment applied to the virtual object.

2. The augmented reality system of claim 1, wherein the one or more processors are configured to:
determine a first gaze line associated with the virtual object at the first virtual depth based on the interpupillary distance; and
determine a second gaze line associated with the virtual object at the second virtual depth based on the interpupillary distance, wherein the lateral adjustment is based on the first gaze line and the second gaze line.

3. The augmented reality system of claim 1, wherein the first virtual depth and the second virtual depth comprise virtual depths of the virtual object in a simulated augmented reality environment or in a simulated virtual reality environment.

4. The augmented reality system of claim 1, wherein the augmented reality headset comprises a plurality of displays configured to display the first virtual image and the second virtual image.

5. The augmented reality system of claim 4, wherein the one or more processors are configured to determine the lateral adjustment along a display line passing through the plurality of displays.

6. The augmented reality system of claim 4, wherein the one or more processors are configured to determine the lateral adjustment based on a distance between a pupil of the user and a display of the plurality of displays.

7. The augmented reality system of claim 4, wherein the plurality of displays comprise semi-transparent displays configured to overlay the first virtual image and the second virtual image on a real world environment.

8. The augmented reality system of claim 1, wherein the augmented reality headset comprises a pupil tracking sensor configured to detect and provide an indication of a pupil position of the user.

9. The augmented reality system of claim 8, wherein the one or more processors are configured to determine the interpupillary distance based on the indication of the pupil position received from the pupil tracking sensor.

10. The augmented reality system of claim 1, wherein the lateral adjustment comprises a lateral shift of a center of the virtual object.

11. A tangible, non-transitory, computer-readable medium, comprising instructions for adjusting display of a virtual object that, when executed by one or more processors, cause the one or more processors to:
generate a first virtual image for display via an augmented reality headset, wherein the first virtual image comprises the virtual object at a first virtual depth;
receive an indication that the virtual object is to be displayed as moving from the first virtual depth to a second virtual depth;
determine a lateral adjustment to be applied to the virtual object based on an interpupillary distance of a user of the augmented reality headset and the indication that the virtual object is to be displayed as moving from the first virtual depth to the second virtual depth; and
generate a second virtual image for display via the augmented reality headset, wherein the second virtual image comprises the virtual object at the second virtual depth and with the lateral adjustment applied to the virtual object.

12. The tangible, non-transitory, computer-readable medium of claim 11, wherein the instructions, when executed by the one or more processors, cause the one or more processors to:
divide half of the interpupillary distance by a first virtual distance between a center point between pupils of the user and a reference point of the virtual object at the first virtual depth to determine a first quotient; and
multiply the first quotient by a distance between a pupil of the pupils of the user and a display of the augmented reality headset to determine a first lateral pupil distance.

13. The tangible, non-transitory, computer-readable medium of claim 12, wherein the instructions, when executed by the one or more processors, cause the one or more processors to:
divide half of the interpupillary distance by a second virtual distance between the center point between the pupils and the reference point of the virtual object at the second virtual depth to determine a second quotient; and
multiply the second quotient by an additional distance between another pupil of the pupils of the user and another display of the augmented reality headset to determine a second lateral pupil distance.

14. The tangible, non-transitory, computer-readable medium of claim 13, wherein the lateral adjustment comprises a difference between the first lateral pupil distance and the second lateral pupil distance.

15. The tangible, non-transitory, computer-readable medium of claim 11, wherein the instructions, when executed by the one or more processors, cause the one or more processors to:
receive input image data comprising the virtual object; and
generate the first virtual image based on the input image data.

16. A method for adjusting display of virtual imagery comprising:
generating a first virtual image for display via an augmented reality headset, wherein the first virtual image comprises a virtual object at a first virtual depth;
receiving input image data comprising an indication that the virtual object is to be displayed as moving from the first virtual depth to a second virtual depth;
determining a lateral adjustment to be applied to the virtual object based on an interpupillary distance of a user of the augmented reality headset and the indication that the virtual object is to be displayed as moving from the first virtual depth to the second virtual depth; and generating a second virtual image for display via the augmented reality headset based on the input image data, wherein the second virtual image comprises the virtual object at the second virtual depth and with the lateral adjustment applied to the virtual object.

17. The method of claim 16, comprising:

determining a first gaze line associated with the virtual object at the first virtual depth based on the interpupillary distance;

determining a second gaze line associated with the virtual object at the second virtual depth based on the interpupillary distance; and determining the lateral adjustment based on the first gaze line and the second gaze line.

18. The method of claim 16, wherein the lateral adjustment comprises a lateral shift of a center of the virtual object.

19. The method of claim 16, comprising determining the lateral adjustment based on a distance between a pupil of the user and a display of the augmented reality headset.

20. The method of claim 16, comprising determining the interpupillary distance of the user based on one or more indications of pupil positions of the user.

\* \* \* \* \*